Figure 1:
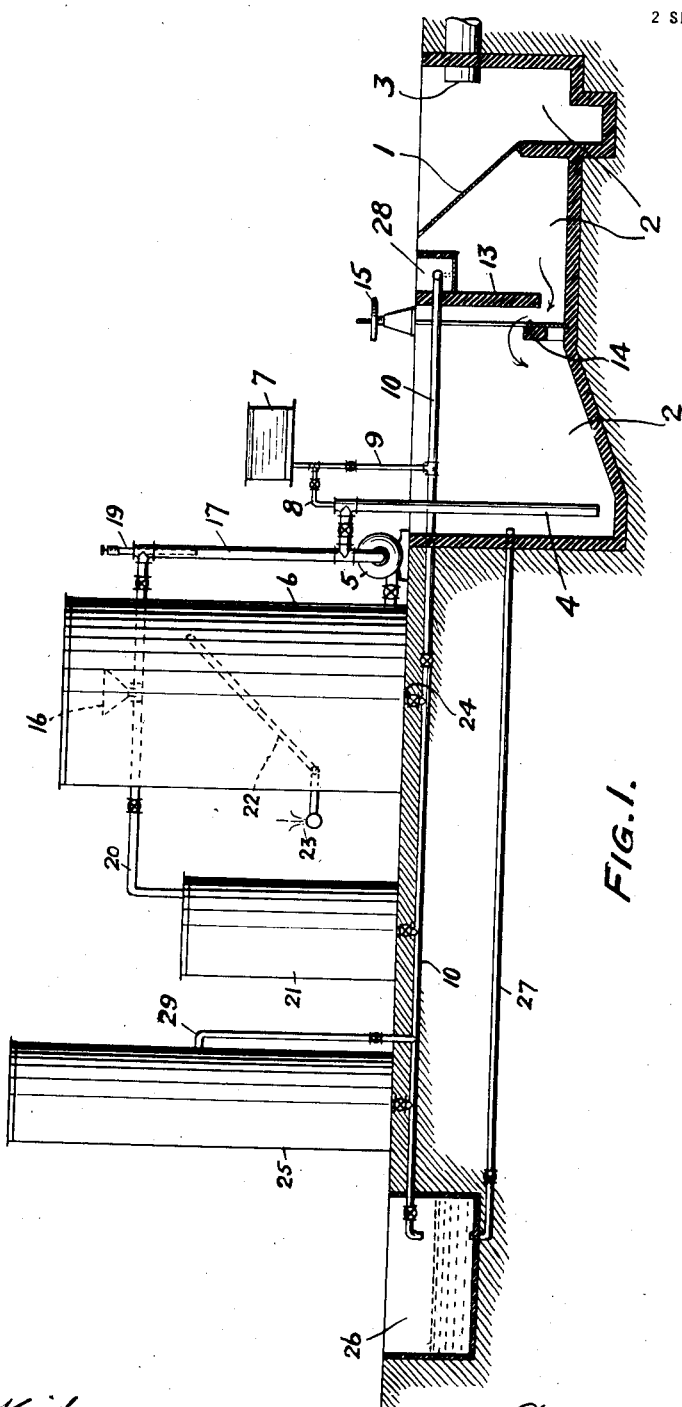

C. W. RICE.
METHOD OF MAKING FERTILIZER FROM CITY AND LIKE WASTE.
APPLICATION FILED SEPT. 30, 1915.

1,348,320.

Patented Aug. 3, 1920.
2 SHEETS—SHEET 2.

WITNESS:

INVENTOR
Cyrus W. Rice
BY
Augustus B. Stoughton
ATTORNEY.

UNITED STATES PATENT OFFICE.

CYRUS WM. RICE, OF PHILADELPHIA, PENNSYLVANIA, ASSIGNOR TO CHEMO-MECHANICAL WATER IMPROVEMENT COMPANY, OF PHILADELPHIA, PENNSYLVANIA.

METHOD OF MAKING FERTILIZER FROM CITY AND LIKE WASTE.

1,348,320. Specification of Letters Patent. Patented Aug. 3, 1920.

Application filed September 30, 1915. Serial No. 53,445.

*To all whom it may concern:*

Be it known that I, CYRUS W. RICE, a citizen of the United States, residing at Philadelphia, in the county of Philadelphia and State of Pennsylvania, have invented a certain new and useful Method of Making Fertilizer from City and like Waste, of which the following is a specification.

The principal objects of the present invention are, to provide a simple and expeditious process of treating raw sewage or like waste, and to recover from the same, material for the manufacture of fertilizer. By this process a temporarily non-decaying, compact or reasonably water-free, de-fatted, deodorized muck is recovered. This contains the fertilizing ingredients of raw sewage in part in undecayed state in connection with a large mass of inert organic and mineral matter, and it does not contain much fatty matter, the presence of which would lessen the fertilizer value of the muck, but which is almost entirely separated from the muck because it is possible, by the mechanics of this process to treat all parts of the sewage. The treating chemicals by this process are not only permitted to come in intimate contact with the fats, the suspended and finely comminuted matters, but also have a coagulating effect upon the colloidal matters and substances in solution.

By this process sewage is not permitted to decay; therefore, it is possible to recover much larger amounts of fertilizer ingredients, as the losses by decay vary with the degree of fermentation. Decay is prevented because the crude sewage is disinfected in such a way that the result is accomplished in a comparatively short time, even when large amounts of organic matter are present and in such a way that the separation is satisfactorily effected by settling and without filtration. The accumulation of gases in sewage is largely eliminated by the intense mechanical aeration and chemical reactions. The water remaining after the removal of the muck is rendered almost entirely free of bacteria and color. It is possible to measure accurately the amount of sewage to be treated, also the necessary amount of the chemicals, thereby insuring thorough treatment and preventing waste of chemicals.

In general, the present improvements consist in the manner or mode of control of all parts and of measuring and of effecting sufficient contact between chemicals and sewage and of getting the reaction under way, and of getting the mass into a disinfected flocculent condition or state from which precipitation or settling of the fertilizer ingredients is rapid, thorough and complete.

The process consists of subjecting fresh sewage and chemicals, and when necessary a portion of the remaining muck from a previous treatment, to a controlled intense agitation with air under pressure and continuous rapid circulation from the top to the bottom of the tank, bringing about a thorough mixing, stirring and breaking up of solid matters until the desired result is obtained.

In the drawing I have illustrated, more or less diagrammatically a form of apparatus in connection with which the practice of my invention may be described.

Figures 2, 3:
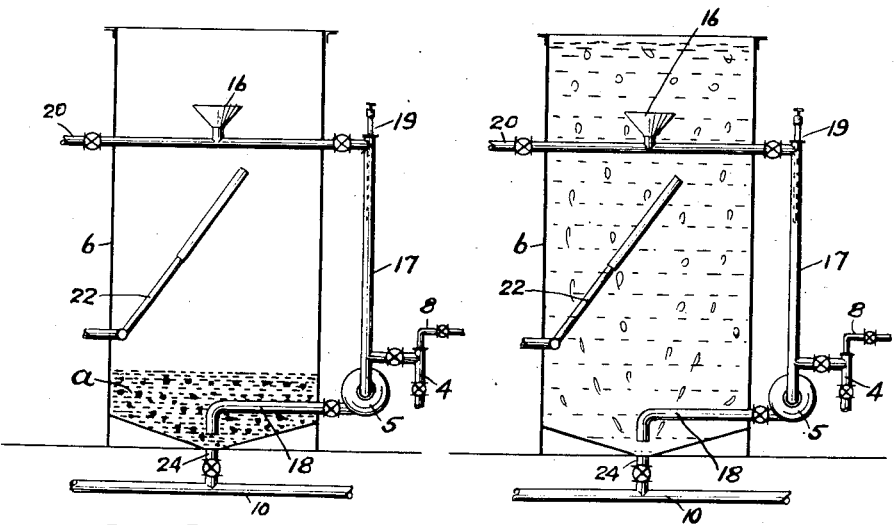
Figure 4:
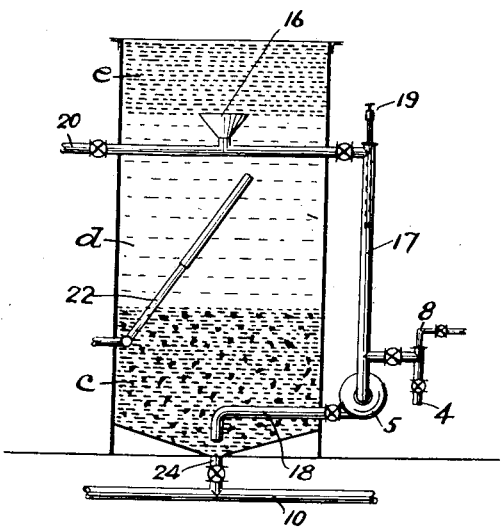

In those drawings, Figure 1 is an elevational view partly in section, and Figs. 2, 3, and 4 are sectional views of parts of the apparatus illustrative of steps of the process.

The process will be described in connection with the apparatus shown in the drawings, although the latter is not claimed in this application and can, of course, be greatly changed and modified.

An admixture of raw sewage and chemicals is prepared and good results are obtained by including previously made precipitated matter. This can be done by pumping raw sewage, roughly strained by strainer 1, from the receptacle 2, into which it flows from the inlet 3, by way of pipe 4, through the centrifugal pump 5 into the bottom of tank 6. Chemicals, such as lime, caustic soda, disinfectants, etc., separately or in combination or first one treatment with one chemical and then another treatment with another chemical may be necessary, depending upon the ingredients in the sewage, are mixed in the tray or holder 7 and may be added to the intake side of the pump by the pipe 8, or to the receptacle 2, by way of pipes 9 and 10. The previously made muck may be left in tank 6, as shown at *a*, Fig. 2, or it may be introduced from some other part of the apparatus as by the pipe 10, and its connections into the receptacle 2. In the latter case, it adds its weight to the floating and suspended ingredients in the sewage on the right hand side of the baffles 13 and 14, and so causes solid matter to fall to the bottom and pass the baffles. This is an advantageous feature as will be apparent to those skilled in the art. Incidentally, it may be said, that the baffle 14, is shown as capable of elevation by means of the hand wheel 15, so that the receptacle 2 can be flushed out, if desired.

The admixture, with or without some of the previously made muck, is then converted chemically and mechanically into a disinfected flocculent mass, meaning that the solid matter, comminuted and thoroughly mixed with the added chemicals, gives the mass a cloudy appearance, that harmful bacteria are destroyed, that methane or marsh gas and other gases are eliminated from the water and that the solid matter is de-fatted and disinfected in a way that persists, thus retaining for future use the nitrogen compounds and chemical precipitates valuable in a fertilizer. Since the solid matter is de-fatted, it can be readily dried and of course the liberated fats are of great value. The admixture in the tank 6, is converted into a flocculent disinfected mass, above described, by circulating it from the top by the intake 16 and pipe 17, and discharging it downwardly at the bottom through pipe 18, after it has passed through the pump 5. This brings about induced aeration under pressure, the air being drawn in at 19, and possibly also at 16, and in passing through the pump the mass is stirred. By way of description and not limitation, this step may continue for about fifteen minutes.

The flocculent mass is then de-flocculated or cleared and the disinfected comminuted muck $c$, water $d$, and grease $e$, are separated by permitting the flocculent mass to stand and settle. By way of description and not limitation, this step may continue for about thirty minutes. The grease is drawn off at 16, and may be run by the pipe 20 into the container 21. The disinfected water is drawn off through the connection 22 which may be of the telescopic variety, and discharged into the air as at 23. The muck is drawn off as at 24, and can be retained in the tank 25, for greater concentration. It is well to design the apparatus in such a way that the bed $c$ of muck shall be about five feet deep and to draw off only three feet of it, leaving two feet as at $a$, in Fig. 2, for the purposes described. The weight of the water above the muck in the tank 6, assists in drawing off the muck for greater concentration through pipes 24, 10 and 29, into the tank 25. The muck may be drawn from the tank 25, to the drying bed 26, and it may be dried since it has been substantially de-fatted. Liquid from the drying bed 26, can be returned by the pipe 27, to the receptacle 2, the line 10, serves as a means for introducing chemicals by way of the pipe 9, or some of the contents of the tanks 25, 21 and 6, by way of the discharge 28, onto the incoming sewage, so as to sink the floating matter by adding weight to it.

The best way known to me for practising the invention and attaining the results is to use calcium oxid or calcium hydrate as described, and in some localities this should be followed by additional treatment with some other chemical or disinfectants.

It may be said that sewage is rich in organic matter that contains nitrogen compounds, and the inorganic matter added to the sewage prevents the liberation of nitrogen because in my process which might be compared to what pharmacists call "water sifting or elutriation," the nitrogen compounds are collected and held in the precipitates *en masse*, and such compounds may be used alone in making a fertilizer or can be mixed with other substances, so as to regulate the percentage of the ingredients of the product.

The proportion of the treating chemicals required are well understood. A definite chemical treatment cannot be stated, however, owing to the constant changing of sewage and the proportions of its organic and inorganic ingredients, also the sudden and uncertain quantities from industrial plants, such as laundries, breweries, dye houses, tanneries, chemical works, etc., all of which have been taken into consideration and mastered by the exercise of the usual knowledge of those skilled in the art.

Attention may be called to the fact that the grease is by the treatment described, liberated in such a way that it is free to rise and rises to the top and so can be easily drawn off and recovered. In other words, the single described treatment accomplishes all the results stated and there is further advantage that the only moving machinery is the pumping machinery. The operation, as described, is somewhat intermittent, but it may be made continuous by using more than one tank 6, and working each tank in the manner described.

It will be obvious to those skilled in the art, to which the invention relates that modifications may be made in details without departing from the spirit of the invention which is not confined to such matters.

What I claim is:

1. The process of making a temporarily non-decaying concentrated, defatted and deodorized product rich in fertilizing substances which consists in making an admixture in predetermined quantitative relations of raw sewage or the like and an inorganic substance adapted to collect the nitrogen compounds present and hold the nitrogen available in the product, subjecting the admixture to agitation with air under pressure and continuous circulation from the top to the bottom to get the mass into a disinfected flocculent state from which precipitation of fertilizer product is rapid, thorough and complete, and permitting the admixture to rest and the described separation of grease water and product to take place.

2. The process of making a temporarily non-decaying, concentrated, de-fatted and deodorized product rich in fertilizing substances which consists in making an admixture in predetermined quantitative relations of raw sewage or the like and an inorganic substance adapted to collect the nitrogen compounds present and hold the nitrogen available in the product, subjecting the admixture to agitation with air under pressure and continuous circulation from the top to the bottom to get the mass into a disinfected flocculent state from which precipitation of fertilizer product is rapid, thorough and complete, permitting the admixture to rest and the described separation of grease water and product to take place, and drawing off the precipitated product from under the liquid.

3. The process of making a temporarily non-decaying, concentrated, de-fatted and deodorized product rich in fertilizing substances which consists in making an admixture in predetermined quantitative relations of the previously made product and raw sewage and an inorganic re-agent adapted to collect the nitrogen compounds present and hold the nitrogen available in the product, subjecting the admixture to agitation with air under pressure and continuous circulation from the top to the bottom to get the mass into a disinfected flocculent state from which precipitation of fertilizer product is rapid, thorough and complete, and permitting the admixture to rest and the described separation of grease water and product to take place.

4. The process of making a temporarily non-decaying concentrated, de-fatted and deodorized product rich in fertilizing substances which consists in making an admixture in predetermined quantitative relations of raw sewage or the like and an inorganic substance adapted to collect the nitrogen compounds present and hold the nitrogen available in the product, subjecting the admixture to aeration and agitation, and permitting the admixture to rest and the described separation of grease water and product to take place.

5. The process of making a temporarily non-decaying, concentrated, de-fatted and deodorized product rich in fertilizing substances which consists in making an admixture in predetermined quantitative relations of raw sewage or the like and an inorganic substance adapted to collect the nitrogen compounds present and hold the nitrogen available in the product, subjecting the admixture to agitation with air under pressure and continuous circulation from the top to the bottom to get the mass into a disinfected flocculent state from which precipitation of fertilizer product is rapid, thorough and complete, adding further chemicals substantially as described to the agitated admixtures, and permitting the admixture to rest and the described separation of grease water and product to take place.

6. In the process of making a fertilizer from sewage the improved step which consists in adding muck, the product of the process to raw sewage preparatory to its treatment, substantially as described.

7. The process of making a fertilizer from city and like waste, which consists in preparing an admixture of raw sewage and of a chemical substance adapted to preserve the phosphates and salts and to sterilize the finished product, subjecting the admixture to violent agitation and aeration under pressure and circulation from the top to the bottom thereof thereby liberating methane or marsh gas and other gases and extracting the grease from and comminuting the solid matter and preventing or opposing decay and conserving the phosphates and salts and solid matter in comminuted form, adding another chemical substance during the agitation and aeration adapted to precipitate the first mentioned chemical, permitting the weight of the precipitate to bring down the comminuted solid matter from the grease and water by allowing the mass to stand, and separately drawing off the grease and water and solid matter or fertilizer, substantially as described.

8. The process of making a temporarily non-decaying, concentrated, defatted and deodorized product rich in fertilizing substances which consists in making an admixture in pre-determined quantitative relations of raw sewage or the like and an inorganic substance adapted to collect the nitrogen compounds present and hold the nitrogen available in the product, subjecting the admixture to agitation with air under pressure and continuous circulation from the top to the bottom to get the mass into a disinfected flocculent state from which precipitation of fertilizer product is rapid, thorough and complete, permitting the admixture to rest and the described separation of grease water and product to take place, and adding the product to raw sewage preparatory to its treatment, substantially as described.

9. The process of extracting ingredients both in solution and suspension from sewage or like waste which comprises filling a receptacle by way of the bottom or near the bottom and when sufficiently filled drawing off the liquid and contents from the top or near the top and returning same to the bottom, substantially as described.

10. The process of extracting ingredients both in solution and suspension from sewage or like waste which comprises filling a receptacle by way of the bottom or near the bottom and when sufficiently filled drawing off the liquid and contents from the top or near the top and injecting air into the same in the course of its return to the bottom, substantially as described.

11. The process of extracting ingredients both in solution and suspension from sewage or like waste which consists in filling a receptacle by way of the bottom or near the bottom and when sufficiently filled drawing off the liquid and contents from the top or near the top and returning same to the bottom in addition to added chemicals for the purpose as substantially described.

12. The process of extracting ingredients both in solution and suspension from sewage or like waste which consists in filling a receptacle by way of the bottom or near the bottom and when sufficiently filled drawing off the liquid and contents from the top or near the top and returning same to the bottom in addition to added, previously made product for the purpose as substantially described.

13. The process of extracting ingredients both in solution and suspension from sewage or like waste which consists in filling a receptacle by way of the bottom or near the bottom in addition to added chemicals and when sufficiently filled drawing off the liquid and contents from the top or near the top and returning same to the bottom in addition to another chemical to complete the desired result for the purpose and substantially as described.

In testimony whereof I have hereunto signed my name.

CYRUS WM. RICE.

Witness:
J. V. HARE.